United States Patent
You et al.

(10) Patent No.: US 9,882,872 B2
(45) Date of Patent: Jan. 30, 2018

(54) METHOD AND APPARATUS FOR INTER-DOMAIN ROUTING BASED ON AS ARCHITECTURE

(71) Applicant: ELECTRONICS AND TELECOMMUNICATIONS RESEARCH INSTITUTE, Daejeon (KR)

(72) Inventors: Tae-Wan You, Daejeon (KR); Woo-Jik Chun, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 276 days.

(21) Appl. No.: 14/607,136

(22) Filed: Jan. 28, 2015

(65) Prior Publication Data

US 2015/0341310 A1    Nov. 26, 2015

(30) Foreign Application Priority Data

May 26, 2014    (KR) ........................ 10-2014-0063043

(51) Int. Cl.
*G06F 15/16* (2006.01)
*H04L 29/12* (2006.01)
*G06F 17/30* (2006.01)

(52) U.S. Cl.
CPC .... *H04L 61/3025* (2013.01); *G06F 17/30958* (2013.01); *H04L 61/2007* (2013.01)

(58) Field of Classification Search
USPC ................................ 709/245, 223, 218, 250
See application file for complete search history.

(56) References Cited

U.S. PATENT DOCUMENTS

2012/0166658 A1    6/2012    Kim et al.
2012/0177049 A1    7/2012    Xu et al.

FOREIGN PATENT DOCUMENTS

KR    10-2012-0071117 A    7/2012

OTHER PUBLICATIONS

Dongsu Han, et al., "XIA: Efficient Support for Evolvable Internetworking" NSDI, vol. NSDI 2012, San Jose, CA, pp. 14, 2012.

*Primary Examiner* — Lan-Dai T Truong
(74) *Attorney, Agent, or Firm* — LRK Patent Law Firm

(57) ABSTRACT

A method and apparatus for inter-domain routing based on AS architecture includes retrieving route information for a destination IP address of a data packet received from a source host in a forwarding information base (FIB); requesting to obtain a domain locator corresponding to the destination IP address to the mapping system when the route information corresponding to the destination IP address is not retrieved; and performing routing by using the obtained domain locator and routing information that is previously stored in the routing information base (RIB) in which the source host is present.

10 Claims, 10 Drawing Sheets

FIG. 3

| Relation | Service provision | Spatial expression | DAL |
|---|---|---|---|
| Provider-Subscriber | P → C | P (C) | P ← C |
| Peering | P1 ↔ P2 | group (P1 P2) | For P1 Same for P2: P2 ← P1 ; group ← P1 |
| Transit Aggregated Detailed | T1 ↔ T2, T3 ↔ T4 (interconnected) | group (T1 T2 T3 T4) | For T1 Same for T2,T3,T4: group ← T1 ; T1 → T2 → T3 → T4 |

| Destination Address (AS number) | Next-Hop Address (Next-Hop ASN) | Next-Hop GW address (IP address) | Metric |
|---|---|---|---|
| D5's ASN | D6's ASN | 129.254.15.1 | 4 |
| D6's ASN | D6's ASN | 129.254.15.1 | ... |
| D7's ASN | D6's ASN | 129.254.15.1 | 4 |
| D8's ASN | D8's ASN | 147.46.128.1 | ... |
| D1's ASN | D6's ASN | 129.254.15.1 | 10 |
| D2's ASN | D8's ASN | 147.46.128.1 | 10 |
| D2's ASN | D8's ASN | 147.46.128.1 | 9 |
| ⋮ | ⋮ | ⋮ | ⋮ |

FIG. 6

| Destination Address (AS number) | Next-Hop Address (Next-Hop ASN) | Next-Hop GW address (IP address) | Metric |
|---|---|---|---|
| 192.168.72.197 | Domain 6 | 129.254.15.1 | |
| 130.168.92.181 | Domain 6 | 147.46.128.1 | |
| 201.46.216.12 | Domain 6 | 147.46.128.1 | |
| ⋮ | ⋮ | ⋮ | ⋮ |

FIG. 7

| Destination ID (IP address) | TTL | Type | Data (목적지 DAG Locator) |
|---|---|---|---|
| 192.168.72.190 | 8160 | DAL | T'sASN::D9'sASN::D3'sASN::T2'sASN |
| 192.168.72.192 | 8160 | DAL | T'sASN::D9'sASN::D3'sASN::T2'sASN |
| ⋮ | ⋮ | ⋮ | ⋮ |

METHOD AND APPARATUS FOR INTER-DOMAIN ROUTING BASED ON AS ARCHITECTURE

CROSS REFERENCE TO RELATED APPLICATION

This application claims the benefit of Korean Patent Application No. 10-2014-0063043, filed on May 26, 2014, entitled "Method and apparatus for inter-domain routing based on AS architecture", which is hereby incorporated by reference in its entirety into this application.

BACKGROUND OF THE INVENTION

1. Technical Field

The present invention relates to a method and an apparatus for inter-domain routing based on AS architecture and more particularly, to a method and an apparatus for efficient inter-domain routing with scalability based on AS architecture.

2. Description of the Related Art

Roles of IP-based Internet are growing as social infrastructure as well as communication infrastructure. More and more terminals such as cell phones, small sensors and the like become connected to the internet, which has been used to connect between general computers. Recently, Internet service providers (ISP) and contents providers (CP), which have business purposes, have been introduced with increases in internet connections with such terminals. They provide independent networking areas which are called as autonomous systems (AS) and use a boarder gateway protocol (BGP) as an inter-domain routing protocol based on the AS architecture.

However, the BGP requires complex policy routings due to various business relationships and policies between ASs and route bypasses through traffic engineering. In addition, the BGP has some drawbacks in modifying paths since it disseminates route information only when it is updated and having a long period of convergence time.

SUMMARY OF THE INVENTION

An object of the present invention is to provide a method and an apparatus for inter-domain routing which is able to support to improve scalability and performance of routing path by using existing AS architecture and autonomous system number (ASN), while it uses original IP-based application services which have been used in existing hosts.

In order to achieve the above-described object, there is provided a method for generating a domain locator in an hierarchical domain architecture according to an embodiment of the present invention. The method may include advertising by a upper domain at least one of an autonomous system number (ASN) and a domain locator thereof to a lower domain based on the relation between domains; and generating by the lower domain, which receives the at least one of an autonomous system number (ASN) and a domain locator from the upper domain, its own domain locator by using the received at least one of an ASN number and a domain locator of the upper domain and its own ASN number.

In an embodiment, the domain locator is a directed acrylic locator (DAL) expressing routing information to forward a packet to a transit core, which is the top-level in domains, in a dynamic acrylic graph (DAG) form.

In an embodiment, the step for advertising at least one of an autonomous system number (ASN) and a domain locator thereof may include: advertising by the transit core, which is the top-level domain, its own ASN number; and advertising by the rest of the upper domain, except the top-level, its own domain locator.

In an embodiment, the step for advertising at least one of an autonomous system number (ASN) and a domain locator thereof may transmit its own tier number to the lower domain.

In an embodiment, the relation between domains is one of provider-subscriber, peering and transit group.

In an embodiment, the method may further include generating by the lower domain, when it receives at least one of ASN number and domain locator from the upper domain, routing information to forward a packet to the transit core in a DAG form based on the received ASN number to store the result to a routing information base (RIB).

In an embodiment, the RIB includes next-hop information and next-hop gateway information by destination, wherein the next-hop information by destination may be expressed by ASN and the next-hop gateway information may be expressed by IP address.

In an embodiment, the method may further include registering the DAL generated by each domain to a mapping system by mapping onto the IP address block used in the domain.

According to another aspect of the present invention, there is provided an inter-domain routing method including: retrieving route information for a destination IP address of a data packet received from a source host in a forwarding information base (FIB); requesting to obtain a domain locator corresponding to the destination IP address to a mapping system when the route information corresponding to the destination IP address is not retrieved; and performing routing by using the obtained domain locator and routing information that is previously stored in the routing information base (RIB) in which the source host is present.

In an embodiment, the domain locator may be generated by using the upper domain's ASN number or domain locator received from the upper domain and its own ASN number.

In an embodiment, the domain locator expresses routing information to forward a packet to a transit core, which is the top-level in the domains, in a DAG form.

In an embodiment, the mapping system stores mapping relation between an IP address and a domain locator.

In an embodiment, the step for performing routing includes: setting up path by a domain gateway of a sink domain, in which the source host is present, by using the domain locator obtained from the mapping system and the routing information that is previously stored in its own routing information base (RIB) and storing the set path information to the FIB; and transmitting a path-setup message to a BG of the next-hop domain according to the set path, wherein the path-setup message includes the destination IP address and a domain locator corresponding to the destination IP address.

In an embodiment, the path-setup message may be transmitted till it reaches to the domain corresponding to the destination IP address.

In an embodiment, the RIB may include next-hop information and next-hop gateway information by destination, wherein the next-hop information by destination is expressed by ASN and the next-hop gateway information is expressed by IP address.

In an embodiment, the routing may be performed whenever a data packet to be transmitted to a new destination IP address is generated.

According to another aspect of the present invention, there is provided a domain gateway apparatus. The apparatus includes: a processor; and a memory storing program instructions that, when executed by the processor, causes the processor to: receive at least one of an ASN number and a domain locator of its own upper domain from a gateway apparatus of the upper domain; generate its own domain locator by using the received at least one of an ASN number and a domain locator of the upper domain and its own ASN number; and advertise the domain locator generated by using its own ASN number to its own lower domain.

A domain gateway apparatus according to another aspect of the present invention includes: a processor; and a memory storing program instructions that when executed by the processor, causes the processor to receive a data packet from a source host; retrieve route information for a destination IP address of, the data packet from a forwarding information base (FIB); request to obtain a domain locator corresponding to the destination IP address to a mapping system when the route information corresponding to the destination IP address is not retrieved; and perform routing by using the obtained domain locator and routing information that is previously stored in a routing information base (RIB).

The present invention is to resolve problems in mobility and multihoming associated with current internet's IP address architecture and problems in scalability of inter-domain routing caused therefrom. The present invention, assigns a new locator for inter-domain routing and implements for scalability of the RIB and the FIB.

According to the present invention, a host and IP addresses of the number of routers on an existing IGP can be used as they are and mobility and muitihoming can be supported by separating functions identifiers (IDs) of the existing IP addresses and locators.

Accordingly, IP addresses which have been used can be used as they are with various ID/locator separation architectures and it can be easily and practically applied in the present invention since it needs to change only boarder gateway (BG) which is responsible to inter-domain routing. Particularly, designing a mapping system is not easy in general ID/locator separation architectures but it can be easily designed by utilizing existing DNS or tree architecture in the present invention due to a mapping system using IP addresses.

BRIEF DESCRIPTION OF DRAWINGS

FIG. 3 conceptually illustrates relation between domains in the domain architecture of FIG. 1.

FIG. 6 illustrates an example of a forwarding information base (FIB) generated through a routing process according to, an embodiment of the present invention.

FIG. 7 illustrates an example of a mapping system according to an embodiment of the present invention.

DESCRIPTION OF EXAMPLE EMBODIMENTS

Figure 1:
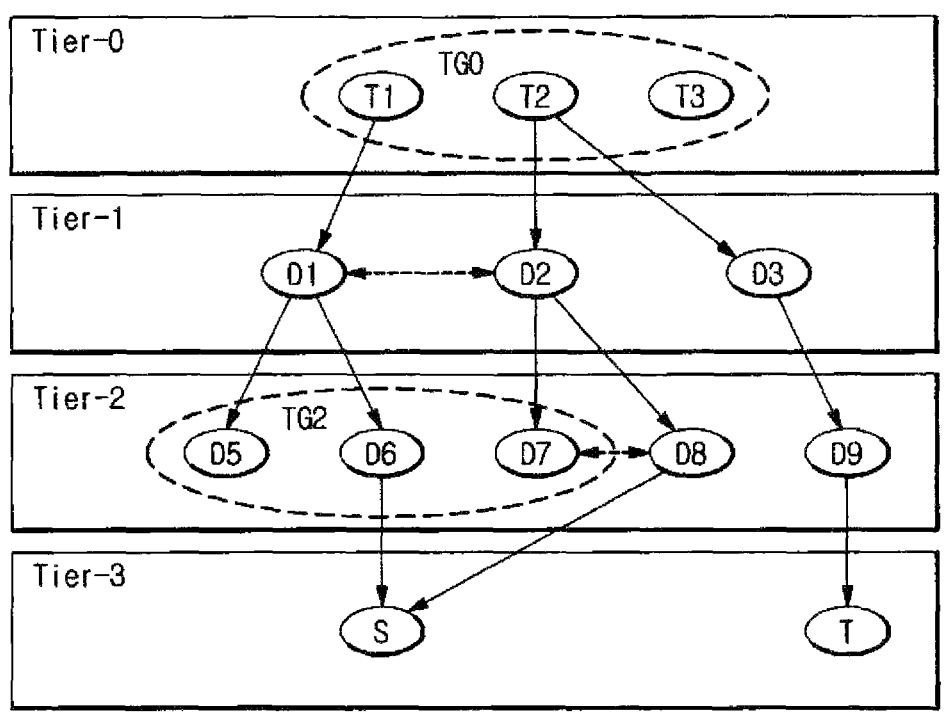
FIG. 1 is a network topology configured with autonomous systems to which the present invention can be applied.

While the present invention has been described with reference to particular embodiments it is to be appreciated that various changes and modifications may be made by those skilled in the art without departing from the spirit and scope of the present invention, as defined by the appended claims and their equivalents.

Throughout the description of the present invention, when describing a certain technology is determined to evade the point of the present invention, the pertinent detailed description will be omitted.

Unless clearly used otherwise, expressions in the singular number include a plural meaning such as "at least one".

In the present description, expressions such as "module", "part", "interface" and the like generally mean computer-related objects such as hardware, software and its combination.

A border gateway protocol (BGP), which is a representative protocol of inter-domain routing protocols based on AS architecture is a protocol to connect between autonomous systems of the world and conduct routing and is thus more oriented for complementation, availability and sustainability rather than performance. The BGP is designed to perform policy-based routing for data transmission through business relationship between ISPs.

The BGP is a path-vector routing protocol using an autonomous system number (ASN) to transmit IP prefix information on each AS. BGP routers are connected through a TCP (pod 179) session to exchange routing information between routers and set a routing path in which a loop free path is set up by using a path vector which adds an ASN.

However, BGP routing requires a complex policy routing due to various business relationships and policies between ASs and route bypass through traffic engineering. Thus, because the router sets a routing path by setting a variety of attributes and each router provider has different setup methods and has to reflect various policies, it requires complex setups. Such complications cause mistakes in BGP routing setups and risks in entire internet channels or misroutes. When wrong AS information and IP prefix information are transmitted, it may cause serious security problems.

In the BGP, since only when route information is updated, it is transmitted, routing is not easy and it also requires a long period of convergence time. Due to such problems, entire topology information of the internet cannot be known and finally it will be difficult to obtain an optimized route.

Size of a BGP routing table has increased rapidly due to increases in the number of terminals, mobility, traffic engineering, multihoming and the like and table size at a default route free zone (DFZ) becomes significantly larger.

Furthermore, the BGP is an exterior gateway protocol (EGP) and thus assigns an interior BGP (iBGP) to share routing information between BGP routers inside the AS. However, it requires connection in a full mesh method for such iBGPs which further cause problems in scalability.

Various architectures for future internet have been suggested and developed in order to resolve such problems. However, most of methods exclude an internet routing architecture using current IP addresses, so that it cannot resolve problems associated with the current IP address-based inter-domain routing architecture.

Therefore, an object of the present invention is to provide an inter-domain routing architecture which not only uses IP-based application services which are being currently used in existing hosts but also improves scalability and routing performance by using existing AS architectures and ASNs.

The present invention uses IP addresses as they are to use current host application services and IP-based internet as they are. In the existing internet, an IP address is used as an identifier and a locator for a service at the same time. However, the present invention defines a new locator for inter-domain routing, while it uses an IP address as an identifier for a service, also in IGP in an AS.

The present invention defines a new locator for expressing a path to forward a packet to a transit core (or a default route free zone (DFZ)) in a directed acyclic graph (DAG) form by using currently used ASN. The new locator can be classified to a sink locator defining a path from a sink to a transit core and a destination locator defining a path from a destination to a transit core. Particularly, the present invention defines a new locator with a directed acyclic locator (DAL), expressed by a directed acyclic graph (DAG).

In an embodiment of the present invention, each AS domain automatically generates a DAL by itself for end-to-end communication. The final end-to-end path can be then formed by combining a DAL of the sink domain (sDAL) in which a source host is present, and a DAL of the target domain (dDAL) in which a target host is present.

In an embodiment, an effective routing may be performed by using the shortest path algorithm and peering information during forming the end-to-end pass.

A mapping system that stores mapping information between an IP address, which is used as an ID, and a new locator, should be redefined. Like current DNS which stores mapping relations between URLs and IP addresses, the mapping system of the present invention stores mapping relation between IP addresses and redefined DALs.

According to the present invention, a boarder gateway (BG) is present in each AS domain to perform inter-domain routing. Since the BG uses IP of an existing data packet header as it is, it can be designed to be compatible with an existing system. The present invention thus minimizes changes of data plane and forwarding information base (FIB) hardware which influence actual transmission.

In an embodiment, the boarder gateway automatically builds an ASN path through a control plane and stores this information in a routing information base (RIB) which is a routing table. In an embodiment, the FIB is configured to have an IP address as a key field, while the RIB is configured to have an ASN as a key field. Unlike forming FIB by copying RIB by a router on an existing internet, an additional routing process which forms FIB based on RIB is needed. The routing, process is a process to set routing information to forward a packet from a source IP address to a destination IP address in a FIB of each boarder gateway.

Whenever a packet to be transmitted occurs, the routing process can be performed in a re-active manner. The boarder gateway (BG) of the source transmits a destination IP address by including it in a control packet and each BG receives it and then sets FIB based on the RIB. The end-to-end path should be set by including dDAL corresponding to a destination IP address in the control packet, which is obtained through a mapping system, in order to generate IP address-based FIB. The route can be set according to policies by utilizing peering information by the BG in the routing process.

After the routing process for all BGs performs, a data packet including an IP header can be transmitted in the same manner as in an existing process. There is no overhead such as inserting an additional header for tunneling between BGs in the inter-domain area, unlike ID/LOC separation architectures such as LISP. The packet can be transmitted to a next hop BG through the FIB, like an existing BGP. After it reaches the destination AS, it can be forwarded to the final destination host through IGP.

According to inter-domain routing of the present invention, there is no need to modify the routers that execute a number of host, services and IGPS. The inter-domain routing of the present invention can accommodate data plane of BGs without change and support scalability and performance improvement.

Exemplary embodiments of a DAL generation process which is an ASN-based domain locator, routing information base (RIB) and forwarding Information Base (FIB) generated based on the DAL, a mapping system in which mapping information between IP address and the DAL is stored, and a data transmission process through the DAL-based routing provided in the present invention will be described below in more detail with reference to the accompanying drawings.

FIG. 1 is a network topology configured with autonomous systems which can be applied to the present invention.

As shown in FIG. 1, ASs may be positioned by tiers. Tier number (Tier-1, Tier-2, Tier-3) is assigned in order to receive a service from a transit core (or DFZ, Tier-0) which is called as backbone. It is shown in FIG. 1 that a sink domain(S) where a source host is located and a target domain(T) where a destination host is located are positioned in Tier 3. One AS is referred to as a domain. Each domain has its own ASN. The ASN is a 32-bit global unique number and is assigned and managed by Internet assigned numbers authority (IANA). The present invention defines an ASN-based locator for inter-domain routing.

Figure 2:
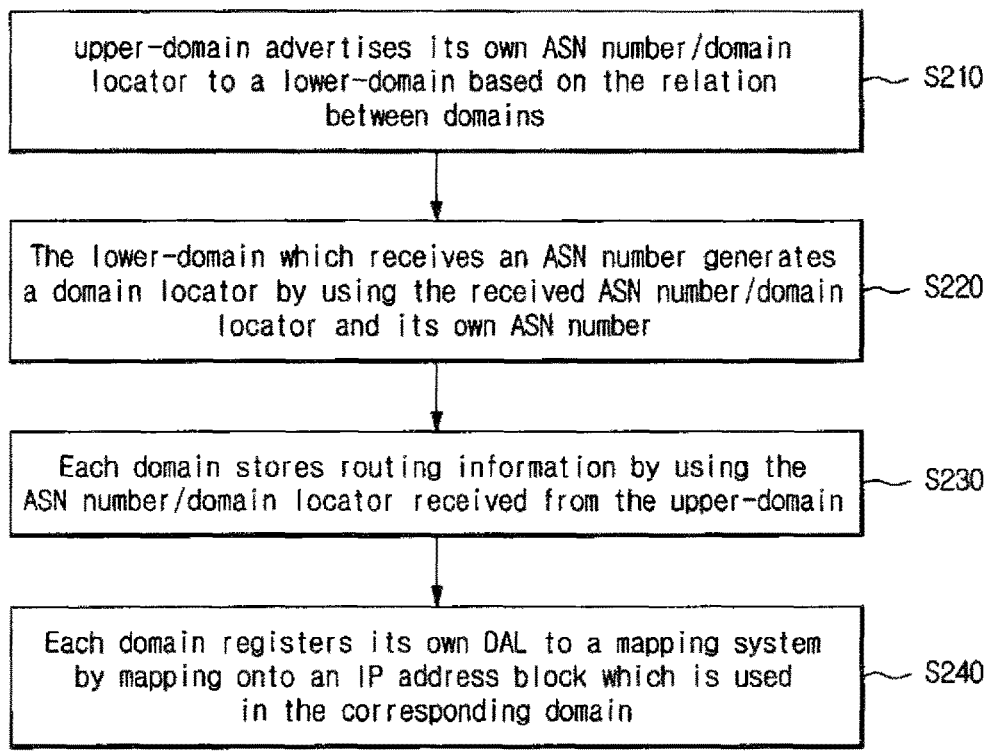
FIG. 2 is a flowchart illustrating a method for generating a domain locator according to an embodiment of the present invention.

FIG. 2 is a flowchart illustrating a method for generating a domain locator according to an embodiment of the present invention.

In S210, a upper domain advertises at least one of its own ASN number and domain locator to a lower domain which is related to the upper domain based on the relation between domains.

Each AS domain generates a DAL by itself. All AS domains can advertise their own ASNs according to the relation with lower domains.

In an embodiment, a transit core advertises its own ASN or domain locator and tier information to its lower domain(s) to build a DAL. For example, when a transit core T1 of Tier-0, which is the most top tier, advertises its own ASN to a domain D1 of Tier-1, the D1 generates a DAL as D1→T1 (D1::T1).

In an embodiment, advertisement of ASN number/domain locator from the upper-tier to the lower-tier is performed based on the relation between domains, in which the relation between domains may be one of provider-subscriber, peering and transit group. Basic advertisement is transmission of information from the uppermost-tier to the lowest-tier in the relation of a subscriber or a transit group, while it advertises between two domains in the peering relation but not globally. It will be described in more detail with reference to FIG. 3.

In S220, the lower domain which receives an ASN number or a domain locator from the upper domain generates a domain locator by using the received ASN number of the supper-domain and its own ASN number.

In an embodiment, the domain locator may be defined as a directed acrylic locator (DAL) which is a locator in a directed acrylic graph (DAG) form. For example, a domain D1 which received an ASN from a transit core can generate a DAL as D1→T1(D1::T1).

In S230, the lower domain generates routing information to forward a packet to the transit core in a dynamic acyclic graph (DAG) form by using the ASN number or domain locator received from the upper domain and stores it in a routing information base (RIB). Detailed architecture of the RIB will be explained with reference to FIG. 5.

In S240, each domain registers the DAL generated by itself to a mapping system by mapping onto an IP address block which is used in the corresponding domain. Each domain registers the DAL generated by itself as position information of the IP address block which itself uses. Detailed architecture of the mapping system will be explained with reference to FIG. 6 below.

In an embodiment, the DAL generation process may be performed by a boarder gateway (BG) of each domain.

FIG. 3 illustrates relation between domains in the domain architecture of FIG. 1.

As shown in FIG. 3, the relation between domains may be expressed by at least one of "provider-subscriber", "peering", and "transit group".

In an embodiment, in the "provider-subscriber" relation, a provider domain advertises its own locator and a subscriber domain which received it may generate a DAL in a form of "locator.provider::locator.susscriber".

In the peering relation, a domain advertises ASN information only to its counterpart domain not to advertise peering-relation information globally. In the transit group relation, an ASN referring to a common group can be generated to advertise it globally. The peering relation can express a DAL by two ways. It can be expressed by "locator.groupid::locator.own" by forming a virtual transit group or 2 DALs can be generated by combining peering domains into one provider. In an embodiment of the present invention, in case of that peering relation between particular AS domains is made, a virtual transit group can be generated to simply express this relation and it can be expressed by including peering domains to the corresponding transit group.

Figure 4A:
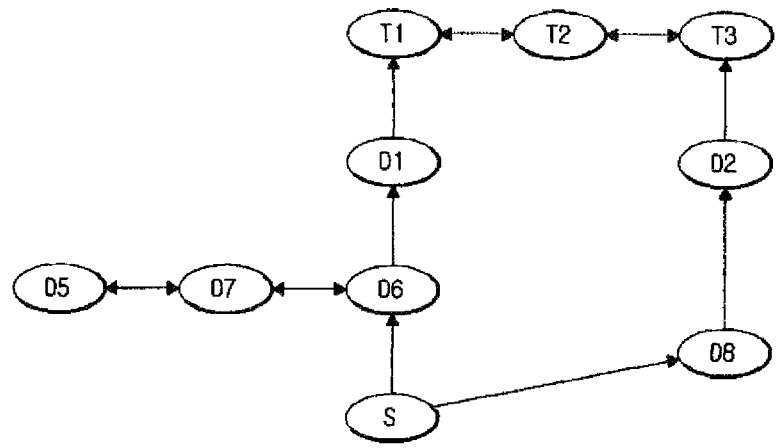
FIG. 4a illustrates sDAL generated by the sink node of FIG. 1.
Figure 4B:
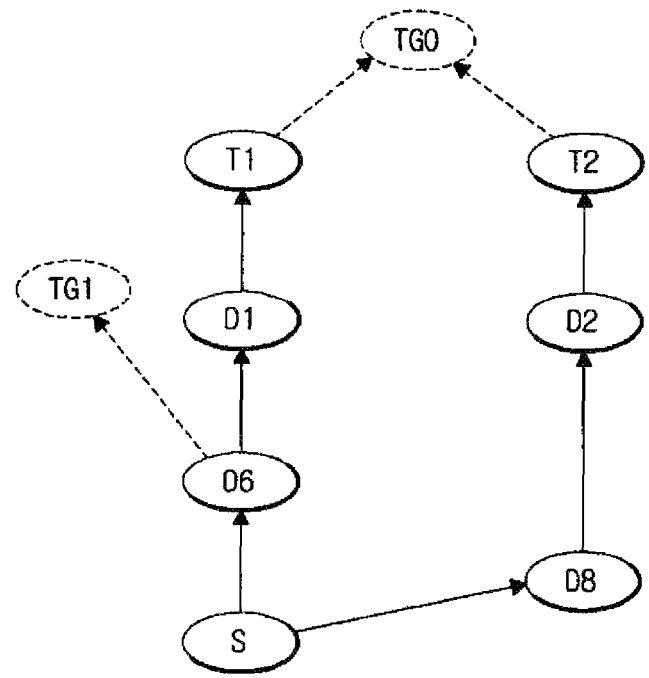
FIG. 4b illustrates a simplified expression of peering of FIG. 4a into a transit group.
Figures 4C, 5:
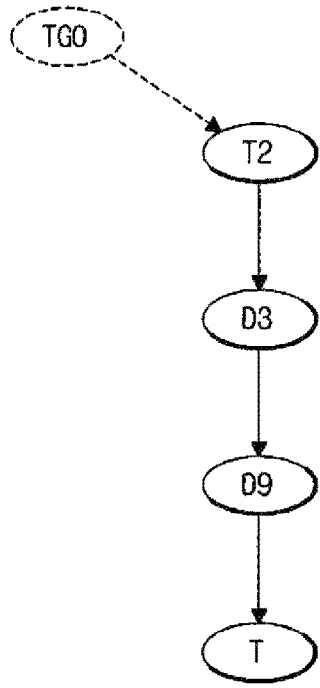
FIG. 4c illustrates dDAL of a target node.
FIG. 5 illustrates an example of a routing information base (RIB) according to an embodiment of the present invention.

FIG. 4A illustrates sDAL forwarding to the transit core which is a DAL generated in the sink node of FIG. 1, FIG. 4B illustrates a further simplified expression of peering and transit group relation of FIG. 4A into a transit, group, and FIG. 4C illustrates dDAL of a target node.

FIG. 5 illustrates an example of a routing information base (RIB) according to an embodiment of the present invention.

Particularly, FIG. 5 illustrates an example of a RIB of the sink domain of FIG. 1. As shown in FIG. 5, routing information of shortest paths of all domains available in the sink domain S is set up in a RIB table.

In an embodiment, destination IP addresses and next-hop addresses in the RIB table are expressed by ASNs, while next-hop gateway addresses are expressed by IP addresses.

In an existing internet, a forwarding information base (FIB) is generated by assigning destination IP addresses as a key field from the result of RIB information-based longest prefix matching. On the contrary, according to the present invention, a forwarding information base (FIB) is generated by an on-demand method through a RIB-based routing process.

When a host which is present on each domain begins a service through the internet, a boarder gateway (BG) of the corresponding domain can perform an address resolution process which requests a locator corresponding to a destination IP address (dDAL) to a mapping system. This obtained dDAL is attached to the redefined "routing" control message, so that the BG which receives the corresponding control message can generate a FIB.

The routing process is performed by a hop-by-hop routing. The gateway which receives the routing control message can generate FIB information, which is stored in, a soft-state form. Since each gateway stores DAG information to forward a packet to the transit core in its own RIB, FIB information can be generated by combining dDAL included in the routing control message, which is DAG information for forwarding a packet from the transit core to destination, and the corresponding DAG information.

FIG. 6 illustrates an example of a FIB generated through a routing process according to an embodiment of the present invention. Particularly, the FIB in FIG. 6 illustrates an example of FIB generated in D5 of FIG. 1. As shown in FIG. 6, a next-hop ASN and a gateway address are stored by destination address and the gateway address is stored with IP address allocated to the corresponding gateway.

FIG. 7 illustrates an example of a mapping system according to an embodiment of the present invention.

As described above, since a dDAL corresponding to a destination IP address is obtained through a mapping system (MS) in the routing process of the present invention, it is necessary to store a DAL corresponding to a MS destination IP address according to the present invention. A MS table has architecture similar to an existing DNS, so that it can be used in an existing DNS architecture. "Type" in the MS table can use by extending record type of DNS and "Data" expresses DAG information of ASN forwarding to the transit core by using "::".

In an embodiment, a boarder gateway of each domain can register IP address blocks which its own domain uses at once to the MS. For example, it is assumed that a domain manages a block of 129.254.15.x/24 and it is already known through the ASN advertisement that DAL information of the block is D8→D2→T2. The gateway transmits a message to request for registration of IP address of the corresponding block and DAL information corresponding thereto to the MS. The MS registers the block of 129.254.15.x/24 and DAL of D8::D2::T2 in response thereto and returns acknowledgement message to the gateway to inform that the registration is successfully completed.

Each domain builds at least one MS to have authority for and manage IP prefix which is allocated to itself and is able to define and use "DAL" which is a new service type by extending DNS which is located on a local domain.

Figure 8:
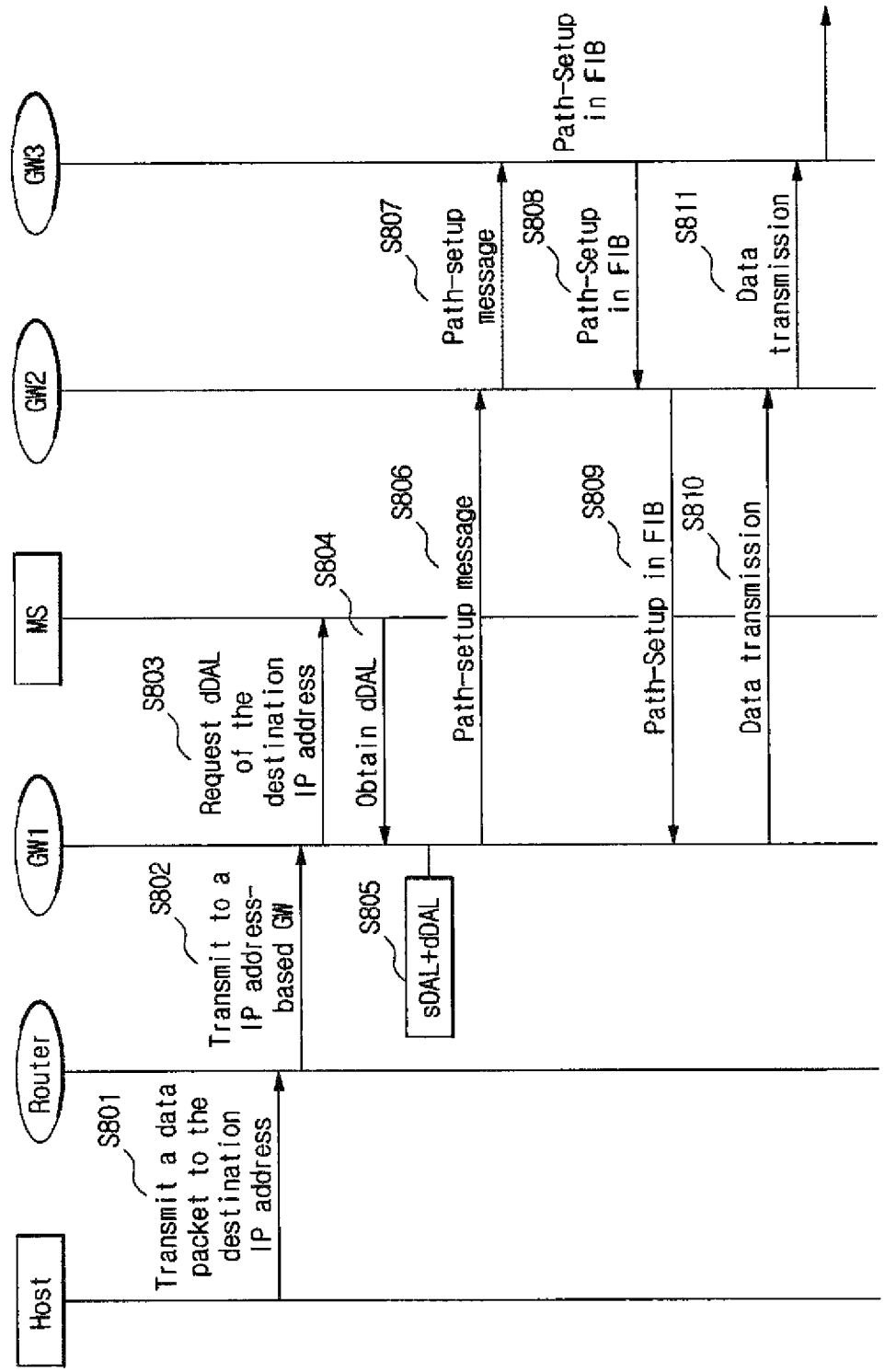
FIG. 8 illustrates a process for transmitting inter-domain data through path-setup according to an embodiment of the present invention.

FIG. 8 illustrates a process for transmitting inter-domain data through routing according to an embodiment of the present invention.

After a host on a sink domain(S) obtains a destination IP address through DNS, it transmits a first data packet to the destination IP address according to a general Internet communication process (S801). The data packet transmitted by the host is forwarded to a boarder gateway (GW1) of the sink domain by the router in the same way as in the existing Internet within the sink domain (S802).

The GW1 retrieves route information (e.g., next-hop information) corresponding to the destination in the FIB to transmit the data packet to the destination. When there is no route information in the FIB, the GW1 determines that routing for the corresponding destination is not performed and then requests to obtain DAL of the destination IP address (destination DAL or dDAL) to a mapping system (MS) (S803, S804).

The GW1 sets the route information to which the data packet is to be transmitted in its own FIB by using DAL (or routing information that is previously stored in a routing information base (RIB) of the sink domain) and dDAL.

The GW1 transmits a path-setup message to a upper-GW (GW2) based on the route information set in the FIB (S806). Here, the path-setup message includes destination IP address and dDAL information, and IP address of the GW can be used as a header to directly transmit the path-setup message to the corresponding GW.

The GW2 receives the path-setup message and then performs RIB-based routing by using dDAL included in the corresponding message and the routing information which itself has GWs on each domain can generate effective path by using peering information which each GW has in this process. In addition, FIB according to local policy can be set in the routing process. The path-setup message is transmitted to a GW3, which is a boarder gateway of the target domain located in the final target host, through hop-by-hop message processing, for example by using sDAL and dDAL (S807). Each GW, which received the corresponding message, receives acknowledge and sets route information in the FIB (S808).

Figure 9:
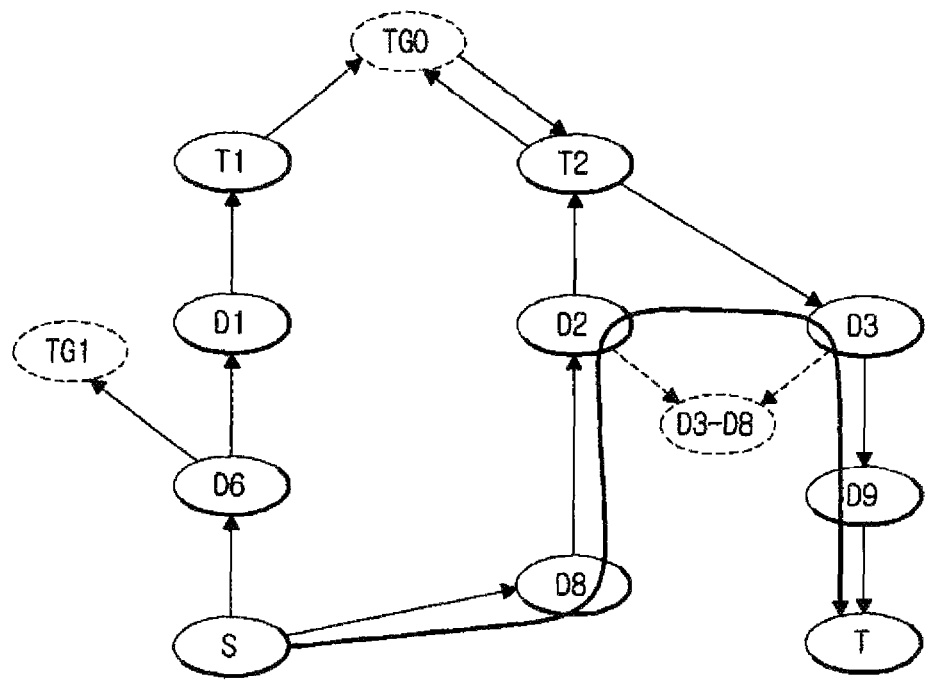
FIG. 9 illustrates path-setup between a sink domain and a target domain in the hierarchical domain architecture of FIG. 1.

Routing shown in FIG. 9 can be possible by combining sDAL shown in FIG. 4B and dDAL shown in FIG. 4C. In an embodiment, routing between the source host and the target host can be possible without reaching to the transit core by using the shortest path algorithm based on the peering information. An, inter domain routing path between the source host and the target host becomes set and data transmission from the source host to the target host can be made according to the set path (S810 to S812).

In an embodiment, when route information corresponding to a destination IP address in the FIB of the GW1 is present, data is transmitted based on the FIB and the route information is maintained not to be lost by resetting cache time of the FIB while transmitting the data.

As described above, whenever a data packet to be transmitted is generated, a re-active routing process to set the FIB can be performed. Although this re-active routing may cause transmission delay till the first data packet is transmitted, it can support scalability since the FIB can be managed in a soft-state without periodic updates. When an IP address is well known, the transmission delay can be minimized by setting the FIB in advance through a hybrid method.

When a target host moves, the mobility can be supported through the same path-setup triggering from the BG which recognizes the target's movement. For example, it is assumed that while hosts on S and T domains communicate, the host of the T domain moves. When a target host moves, the target host obtains information of the new domain to which it moved. Here, since an IP address acts as an identifier of a service and a host, the IP address is maintained and a new domain locator is registered in a mapping system.

The domain T recognizes that a data packet (de-registration message for APR or mobility) is not delivered anymore, and thus obtains domain information of the moved target host through the mapping system without terminating an original service session. The domain T then performs a routing process, re-sets a FIB from the domain T to a new domain and transmits data packets which are reached to the domain T to the newly set FIB.

In the general Internet, there was an overhead for installing and setting new protocols or new agents such as mobile IP or proxy MIP to support mobility. However, according to the present invention, the mobility can be supported spontaneously during the communication process.

In an embodiment, on-demand routing according to the present invention can be performed by employing a software defined network (SON) technology, which is being currently used in data centers.

In an embodiment, SDN controllers can be configured in tiers based on the tier numbers defined to configure inter-domains. For example, a central controller of Tier-1 can set a FIB in a GW which, is included in ASN of the Tier-1. When it moves to upper-Tier-0, it can request to set a GW to a controller in the Tier-O.

Figure 10:
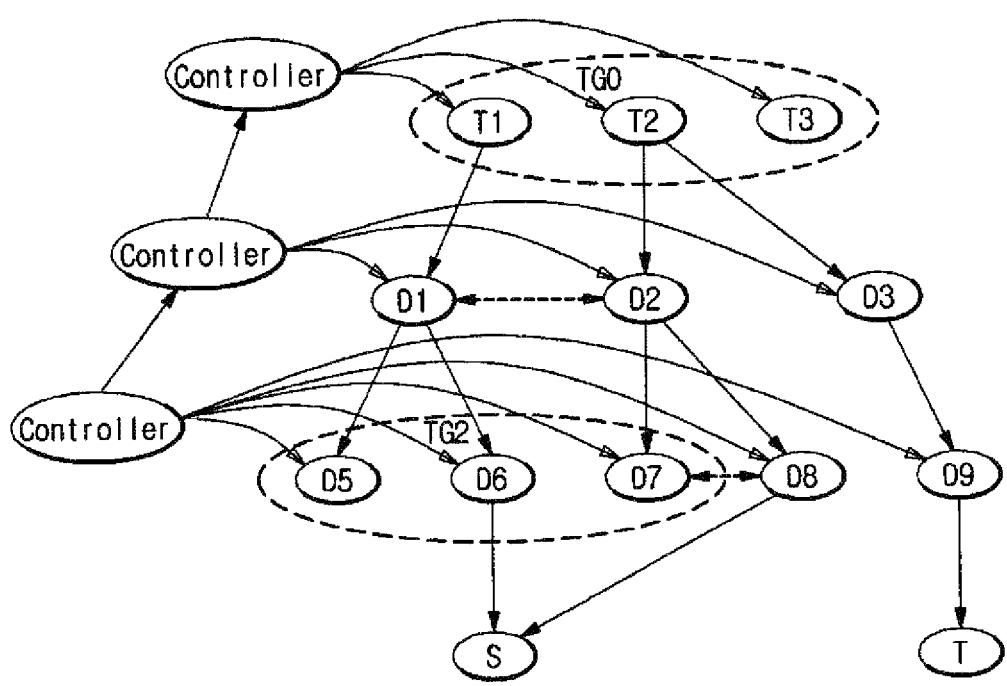
FIG. 10 illustrates an example of hierarchical SON controllers according to an embodiment of the present invention.

In the existing SDN, a logical centralized controller should directly set all switches (or GWs) since an IP address is used as a key. However, according to the present invention, controllers can be built in a distributed hierarchical architecture by using domain tier information and ASN information (see FIG. 10).

As described above, the DAL generation process and the process for inter-domain routing using the DAL can be implemented and executed in a program form to boarder gateways in each domain.

Figure 11:
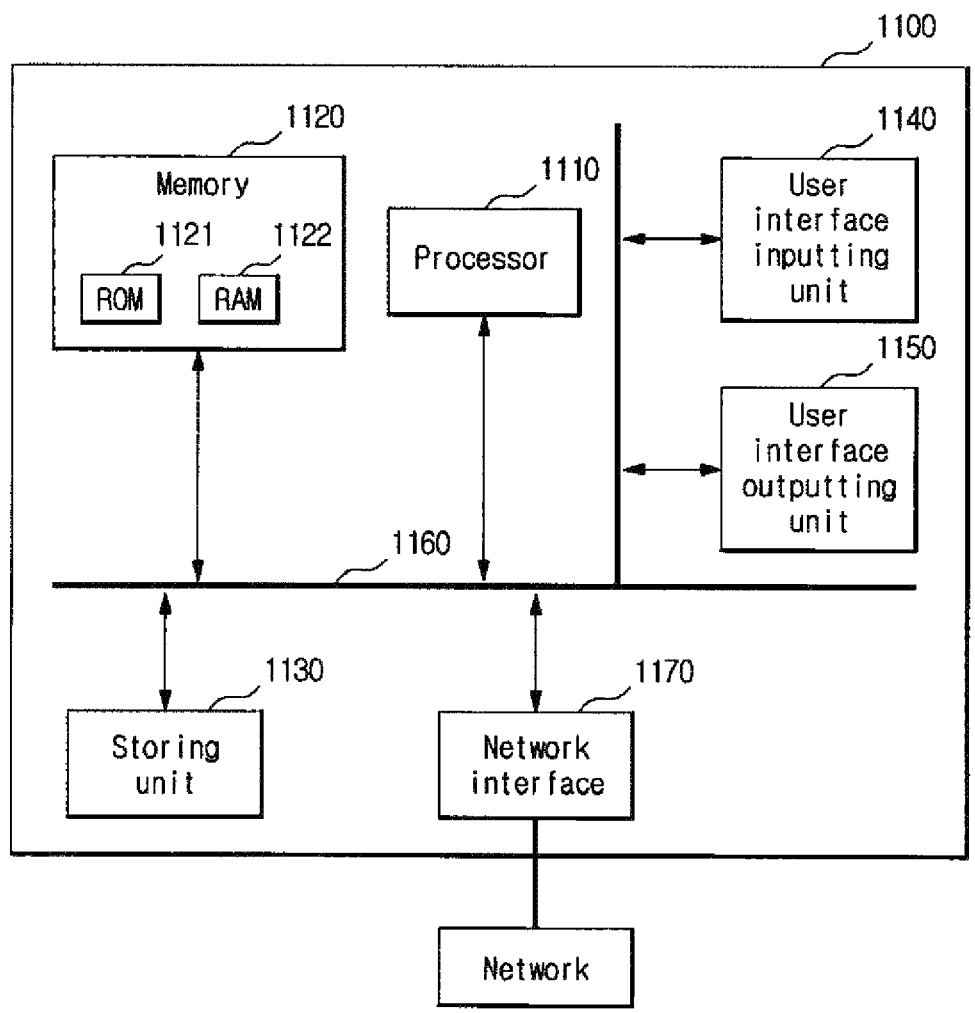
FIG. 11 illustrates a computer system implementing a boarder gateway.

FIG. 11 illustrates a computer system implementing a boarder gateway. As shown in FIG. 11, a computer system 1100 may include at least one of at least one processor 1110, a memory 1120, a storing unit 1130, a user interface inputting unit 1140 and a user interface outputting unit 1150 which can communicate through a bus 1160. The computer system 1100 may further include a network interface 1170 to connect to network. The processor 1110 may be CPU or semiconductor device which executes processing program instructions and is stored in the memory 1120 and/or the storing unit 1130. The memory 1120 and the storing unit 1130 may include various types of volatile/non-volatile storage media. For example, the memory may include ROM 1121 and RAM 1122.

In an embodiment, the DAL generation process and the process for inter-domain routing using the DAL may be implemented in program instructions, stored in the memory 1120, and executed by the processor 1110. Routing information base (RIB) and forwarding Information Base (FIB) may be stored in the memory 1120 and/or the storing unit 1130.

The apparatus and method according to an embodiment of the present invention may be recorded in a computer readable medium by being implemented by any language among various appropriate programming languages which can be performed through various computer means.

The computer readable medium can include program instructions, data files, data structures and the like alone or in a combination.

The program instructions recorded in the computer readable medium can be specially designed for the present invention or available to those who are skilled in the computer software field. An example of the computer readable recording media includes magnetic recording media such as hard disks, floppy disks and magnetic tapes, optical media such as CD-ROMs and DVDs, magneto-optical media such as floptical disks and hardware devices such as a ROM, a RAM, a flash memory and the like which are configured to store and perform program instructions. The above-mentioned medium may be a transmission medium such as optical or metallic lines and waveguides including a carrier which transmits signals to assign program instructions, data structures and the like. An example of the program instructions may include not only machine-language codes which are made by a compiler but also high-level language codes which are executable by a device such as computer processing information electronically by using an interpreter and the like.

The hardware device above mentioned may be configured to perform operations of the present invention as one or more software modules and vice versa.

While it has been described with reference to particular embodiments, it is to be appreciated that various changes and modifications may be made by those skilled in the art without departing from the spirit and scope of the embodiment herein, as defined by the appended claims and their equivalents.

What is claimed is:

1. A computer-implemented method for generating a domain locator in a hierarchical domain architecture, the method comprising:

advertising by a upper domain at least one of an autonomous system number (ASN) and a domain locator thereof to a lower domain based on the relation between domains; and generating by the lower domain, which receives the at least one of an autonomous system number (ASN) and a domain locator from the upper domain, its own domain locator by using the received at least one of an ASN number and a domain locator of the upper domain and its own ASN number.

2. The computer-implemented method for generating a domain locator of claim 1, wherein the domain locator is a directed acrylic locator (DAL) expressing routing information to forward a packet to a transit core, which is a top-level in domains, in a dynamic acrylic graph (DAG) form.

3. The computer-implemented method for generating a domain locator of claim 1, wherein the step for advertising at least one of an autonomous system number (ASN) and a domain locator thereof includes: advertising by a transit core, which is a top-level domain, its own ASN number; and advertising by the rest upper domain, except the top-level domain, its own domain locator.

4. The computer-implemented method for generating a domain locator of claim 1, wherein the step for advertising at least one of an autonomous system number (ASN) and a domain locator thereof transmits its own tier number to the lower domain.

5. The computer-implemented method for generating, a domain locator of claim 1, wherein the relation between domains is one of provider-subscriber, peering and transit group.

6. The computer-implemented method for generating a domain locator of claim 1, further comprising generating by the lower domain, when it receives at least one of ASN number and domain locator from the upper domain, routing information to forward a packet to a transit core in a DAG form based on the received ASN number and store the routing information to a routing information base (RIB).

7. The computer-implemented method for generating a domain locator of claim 6, wherein the RIB includes next-hop information and next-hop gateway information by destination, wherein, the next-hop information by destination is expressed by ASN and the next-hop gateway information is expressed by IP address.

8. The computer-implemented method for generating a domain locator of claim 1, further comprising registering a DAL generated by each domain to a mapping system by mapping onto an IP address block.

9. A domain gateway apparatus comprising:

a processor; and a memory storing program instructions that, when executed by the processor, causes the processor to:

receive at least one of an ASN number and a domain locator of its own upper domain from a gateway apparatus of the upper domain;

generate its own domain locator by using the received at least one of an ASN number and a domain locator of the upper domain and its own ASN number; and advertise the domain locator generated by using its own ASN number to its own lower domain.

10. The domain gateway apparatus of claim 9, wherein the domain locator expresses routing information to forward a packet to a transit core which is a top-level in the domains in a DAG form.

* * * * *